UNITED STATES PATENT OFFICE.

ROBERT GRAHAM, OF SPRINGFIELD, SCOTLAND.

MALTED BREAD AND METHOD OF MAKING SAME.

SPECIFICATION forming part of Letters Patent No. 726,283, dated April 28, 1903.

Application filed May 21, 1901. Serial No. 61,324. (No specimens.)

*To all whom it may concern:*

Be it known that I, ROBERT GRAHAM, a subject of the King of Great Britain, residing at Pitlair, Springfield, in the county of Fife, Scotland, have invented a certain new and useful Improvement in the Manufacture of Digestible Bread, (for which I have applied for a patent in Great Britain, dated December 13, 1900, No. 22,729,) of which the following is a specification.

My invention consists in adding to the ordinary materials employed in the manufacture of bread the flour of malted grain containing diastase, whereby I produce bread of good color and flavor and more digestible than ordinary bread.

The weight of the flour containing diastase may vary from twenty-five to fifty per cent. of the weight of the ordinary flour employed to form the dough in the usual way. This addition is made to the raised sponge along with a small quantity of salt and water—say three to four ounces of salt and half a pint of water to every ten pounds of the flour employed in making the sponge. The whole is thoroughly kneaded together and allowed to stand for about an hour to rise further. It is then divided into portions to make loaves, and these portions may be further kneaded before baking. The portions are then preferably put into tins and placed in an oven at a temperature of about 330° to 350° Fahrenheit and baked for about two and one-fourth hours.

I am well aware that it has been proposed heretofore to add malt or extract of malt to the sponge for the purpose of rendering bread made therefrom more easily digestible; but so far as I am aware a bread containing over fifty-three per cent. of soluble carbohydrates had never yet been made or was capable of being made by the methods hitherto proposed.

Owing to the particular process employed, as hereinbefore described, together with the materials in or about the proportions stated, I obtain a bread containing 24.60 per cent. of moisture, 1.86 per cent. of mineral matter, 0.30 per cent. of fat, 0.56 per cent. of fiber, 9.40 per cent. of nitrogen, 11.10 per cent. of soluble maltose, 41.97 per cent. of soluble dextrine and starch, and 10.21 per cent. of insoluble carbohydrates.

The best breads hitherto made with malt or malt extract and following the usual processes do not contain more than about 12.86 per cent. of soluble carbohydrates.

Having thus described the nature of this invention and the best means I know of carrying the same into practical effect, I claim—

1. The process herein described for the manufacture of a digestive bread consisting in forming a sponge of flour, hot water and yeast, breaking up said sponge and adding thereto water and salt in the proportion of three and one-half ounces of salt and ten ounces of water to every ten pounds of flour used in making the sponge together with two and one-half to five pounds of the flour of malted grain containing diastase, thoroughly kneading the resulting dough and allowing it to rise for one hour whereby the diastase of the malted flour acts upon the starch of the sponge, dividing the dough into portions for loaves and then baking them for about two and one-fourth hours at a temperature of 330° Fahrenheit whereby the bread so made contains about fifty-three per cent. of soluble carbohydrates, as set forth.

2. A digestive bread containing 24.60 per cent. of moisture, 1.86 per cent. of mineral matter, 0.30 per cent. of fat, 0.56 per cent. of fiber, 9.40 per cent. of nitrogen, 11.10 per cent. soluble maltose, 41.97 per cent. soluble dextrine and starch and 10.21 per cent. of insoluble carbohydrates, as set forth.

In testimony whereof I have hereunto set my hand in presence of two subscribing witnesses.

ROBERT GRAHAM. [L. S.]

Witnesses:
 S. MACPHAIL,
 FREDERICK PIATT.